(12) United States Patent
Gao et al.

(10) Patent No.: US 7,848,915 B2
(45) Date of Patent: Dec. 7, 2010

(54) APPARATUS FOR PROVIDING FEEDBACK OF TRANSLATION QUALITY USING CONCEPT-BASED BACK TRANSLATION

(75) Inventors: Yuqing Gao, Mount Kisco, NY (US); Liang Gu, Yorktown, NY (US); Hong-Kwang Kuo, Pleasantville, NY (US); Bowen Zhou, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1155 days.

(21) Appl. No.: 11/501,121

(22) Filed: Aug. 9, 2006

(65) Prior Publication Data

US 2010/0274552 A1    Oct. 28, 2010

(51) Int. Cl.
G06F 17/28 (2006.01)
G06F 17/27 (2006.01)
G06F 17/21 (2006.01)
G10L 21/00 (2006.01)

(52) U.S. Cl. .............. 704/2; 704/3; 704/4; 704/5; 704/6; 704/7; 704/9; 704/10; 704/277

(58) Field of Classification Search .............. 704/2, 704/6, 4, 5, 7, 9, 10, 277
See application file for complete search history.

(56) References Cited

U.S. PATENT DOCUMENTS

| | | | | |
|---|---|---|---|---|
| 5,268,839 A * | 12/1993 | Kaji | ................ | 704/3 |
| 6,219,646 B1 * | 4/2001 | Cherny | ................ | 704/277 |
| 6,243,669 B1 | 6/2001 | Horiguchi et al. | | |
| 6,266,642 B1 * | 7/2001 | Franz et al. | ................ | 704/277 |
| 6,285,978 B1 * | 9/2001 | Bernth et al. | ................ | 704/7 |
| 6,442,524 B1 | 8/2002 | Ecker et al. | | |
| 6,463,404 B1 * | 10/2002 | Appleby | ................ | 704/9 |
| 6,996,518 B2 * | 2/2006 | Jones et al. | ................ | 704/8 |
| 7,219,050 B2 * | 5/2007 | Ishikawa et al. | ................ | 704/3 |
| 7,539,619 B1 * | 5/2009 | Seligman et al. | ................ | 704/277 |
| 2003/0233232 A1 * | 12/2003 | Fosler-Lussier et al. | ..... | 704/251 |
| 2004/0098247 A1 * | 5/2004 | Moore | ................ | 704/4 |
| 2004/0153311 A1 | 8/2004 | Liu et al. | | |
| 2005/0055217 A1 * | 3/2005 | Sumita et al. | ................ | 704/277 |
| 2005/0102130 A1 * | 5/2005 | Quirk et al. | ................ | 704/4 |
| 2007/0118352 A1 * | 5/2007 | Alshawi et al. | ................ | 704/2 |
| 2008/0208565 A1 * | 8/2008 | Bisegna | ................ | 704/4 |

OTHER PUBLICATIONS

Papineni, K., Roukos, S., Ward, T., and Zhu, W. 2001. BLEU: a method for automatic evaluation of machine translation. In Proceedings of the 40th Annual Meeting on Association for Computational Linguistics (Philadelphia, Pennsylvania, Jul. 7-12, 2002). Annual Meeting of the ACL. Association for Computational Linguistics, Morristown, NJ, 311-318.*

(Continued)

*Primary Examiner*—David R Hudspeth
*Assistant Examiner*—Paras Shah
(74) *Attorney, Agent, or Firm*—McGinn IP Law Group; Anne Dougherty

(57) ABSTRACT

A concept-based back translation system includes a target language semantic parser module, a source language semantic parser module, a bi-directional machine translation module, a relevancy judging module, and a back translation display module.

2 Claims, 3 Drawing Sheets

OTHER PUBLICATIONS

Hovy, E., King, M., and Popescu-Belis, A. 2002. Principles of Context-Based Machine Translation Evaluation. Machine Translation 17, (Aug. 1, 2002), 43-75.*

Keiji Yasuda, Eiichiro Sumita, Genichiro Kikui, Sei-ichi Yamamoto, and Masuzo Yanagida. 2003. Real-time evaluation architecture for MT using multiplebackward translations. In Proceedings of Recent Ad-vances in Natural Language Processing (RANLP-2003), pp. 518-522.*

Siu, K.C. / Meng, Helen M. / Wong, C.C. (2003): "Example-based bi-directional Chinese-English machine translation with semi-automatically induced grammars", In Eurospeech-2003, 2801-2804.*

Y. Gao et al, "MARS: A Statistical Semantic Parsing and GenerationBased Multilingual Automatic tRanslation System," Machine Trans-lation, vol. 17, pp. 185-212, 2004.*

Ding Liu and Daniel Gildea. 2005. Syntactic Fea-tures for Evaluation of Machine Translation. In Pro-ceedings of ACL Workshop on Intrinsic and Extrin-sic Evaluation Measures for Machine Translationand/or Summarization.*

M. F. McTear, "Spoken Dialogue Technology: Enabling the Conversational User Face", ACM Computing Surveys, vol. 34, No. 1, Mar. 2002, pp. 90-169.

V. Owei, "An Intelligent Approach to Handling Imperfect Information in Concept-Based Natural Language Queries", ACM Transactions on Information Systems, vol. 20, No. 3, Jul. 20032, pp. 291-328.

L. Gu, Y. Gao, and M. Picheny, "Forward-Backward Modeling in Statistical Natural Concept Generation for Interlingua-based Speech-to-Speech Translation", IBM T.J. Watson Research Center, NY, IEEE, 2003, pp. 646-651.

* cited by examiner

300

APPARATUS FOR PROVIDING FEEDBACK OF TRANSLATION QUALITY USING CONCEPT-BASED BACK TRANSLATION

This invention was made with Government support under Contract No.: NBCH2030001 awarded by DARPA—Defense Advanced Research Projects Agency. The Government has certain rights in this invention.

BACKGROUND OF THE INVENTION

1. Field of the Invention

The present invention generally relates to back-translation, and more particularly to a method and apparatus for providing feedback of the quality of a translation using a concept-based back translation.

2. Description of the Related Art

Back translation is important for providing people with feedback regarding the quality of a translation. Previously, for interlingual-based translation systems, back translation has typically been achieved by generating back the source language based on the interlingual representation. However, when state-of-the-art translation systems have shifted to employ the data-driven statistical approach, where no interlingual representation is available, most of the back translation provided by such systems is obtained by using a real back translation scheme. That is, the same translation scheme is used to translate the translated sentence back to the source language.

Therefore, the back translation produced in this way not only contains the error of the forward translation from source to target language but also the error from translating from the target language back to the source language. To make the situation even worse, most of the translated sentences are not grammatically correct, which makes the backward translation even more erroneous.

Therefore, current back translations contain many more errors compared with the real translation in foreign languages. In particular, people may find the translation wrong when the actual translation to the foreign language was actually correct, which cause people to reject correct translations.

SUMMARY OF THE INVENTION

In view of the foregoing and other exemplary problems, drawbacks, and disadvantages of the conventional methods and structures, an exemplary feature of the present invention is to provide a method and structure which uses a concept-based back translation scheme.

In accordance with an exemplary aspect of the present invention, a concept-based back translation system (and method) includes a target language semantic parser module, which uses statistical techniques including decision trees to train a parser based on annotated corpus in the target language, parses a translated target sentence with the parser, once it has been trained, to extract semantic concepts, and based on results of parsing the translated target sentence, obtains a backward translation of the translated sentence into a source language, a source language semantic parser module, which parses a source language sentence to extract semantic concepts and uses results of parsing the source language sentence to determine a significance and relevance of the extract concepts generated in the target language sentence, a bi-directional machine translation module, which receives a translated target language sentence and converts the translated target language sentence back into the source language, a relevancy judging module, which measures a significance and a relevance of the back translation by semantically comparing the back translation with an original source language sentence, and a back translation display module, which displays the back translation dynamically based on the relevance and the significance of the back translation.

The present invention focuses on a method and apparatus for concept-based back translation, which indicates the concepts in back translation associated with different levels of confidence, and hence greatly reduces the possible errors that are conventionally involved in real backward translations. Accordingly, one can obtain a better understanding of the translation quality with much less erroneous feedback.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
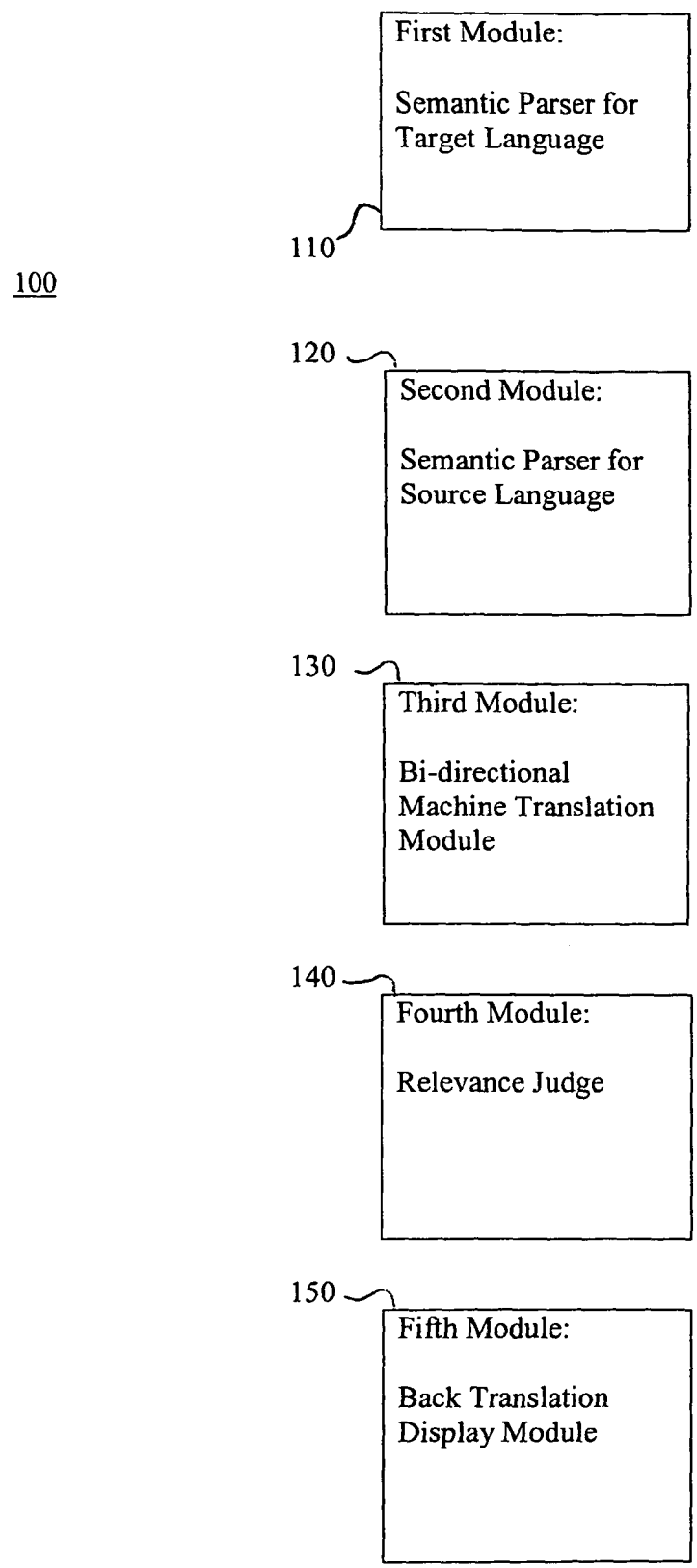
FIG. 1 illustrates a back translation system 100 in accordance with an exemplary aspect of the present invention.
Figure 2:
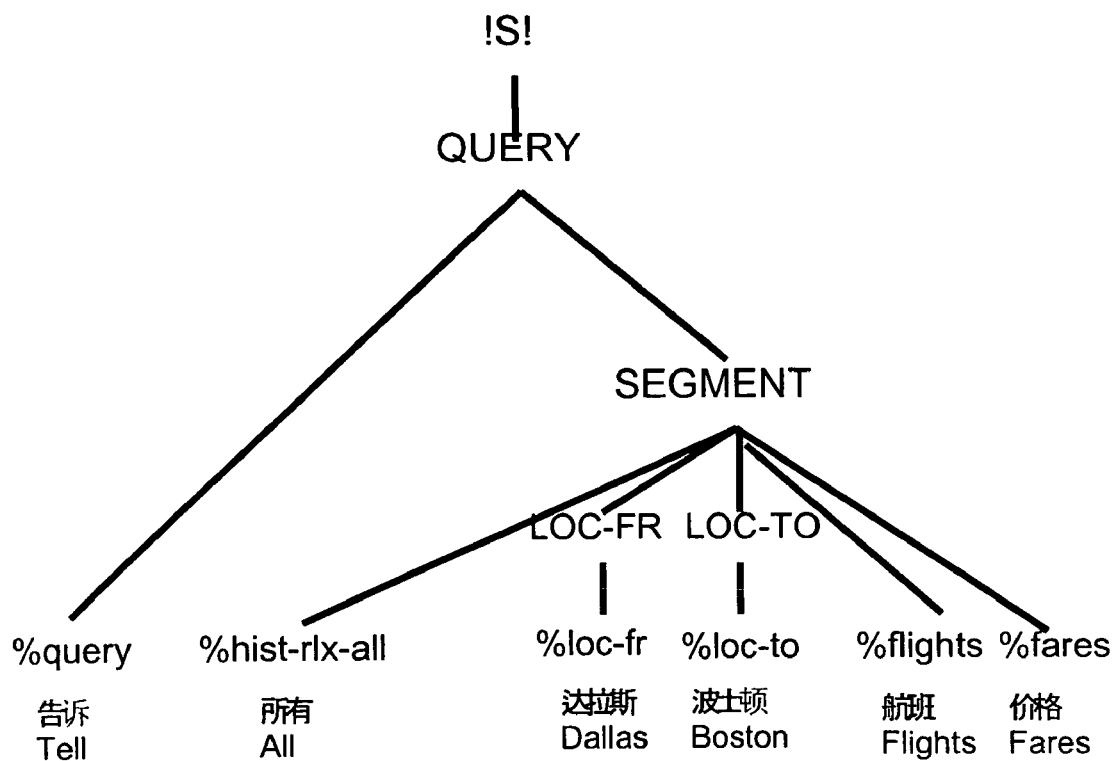
FIG. 2 illustrates an exemplary parsing of a Chinese sentence.
Figure 3:
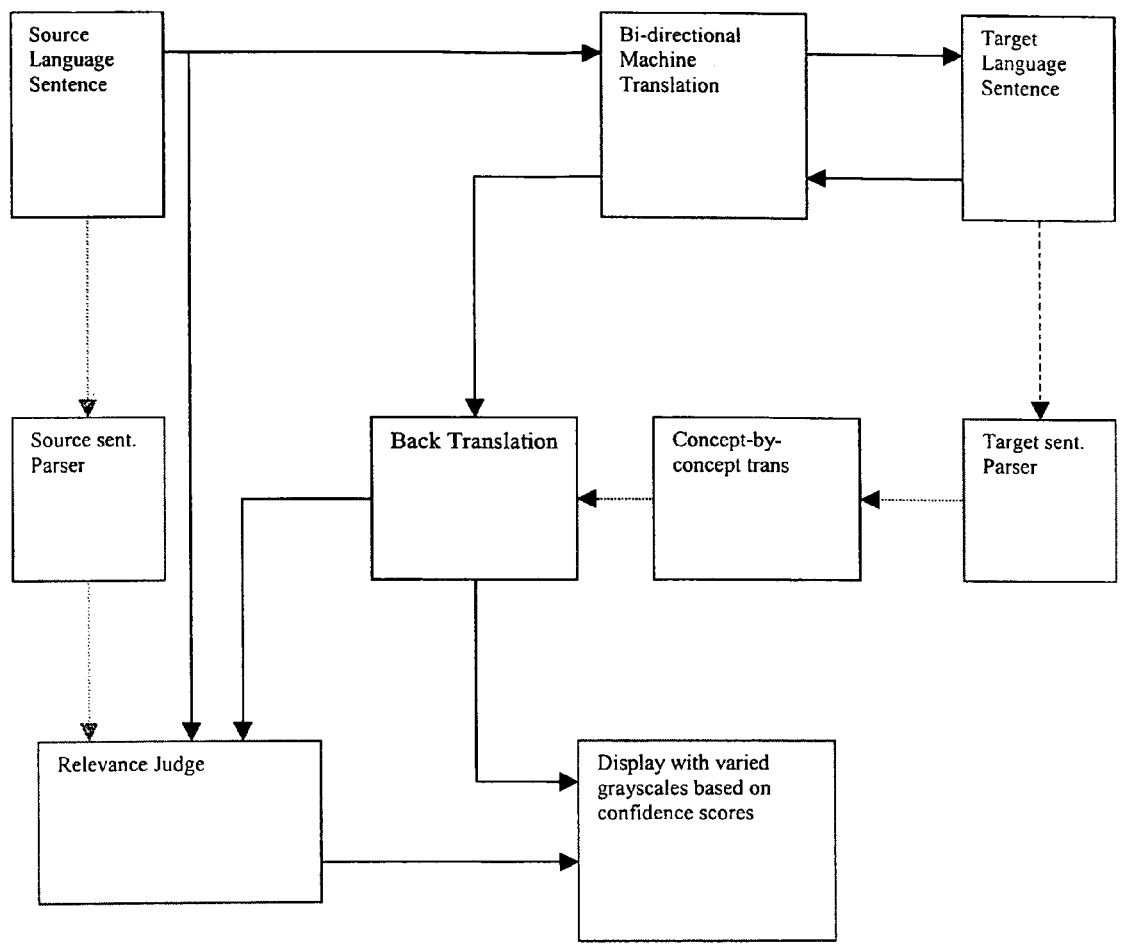
FIG. 3 illustrates a flow diagram of a back translation method 300 in accordance with an exemplary embodiment of the present invention.

Referring now to the drawings, and more particularly to FIGS. 1-3, there are shown exemplary embodiments of the method and structures according to the present invention.

The implementation of this invention is modularized, and depending on the nature of the translation task (e.g., what the source and target language are, what domain it is etc.) and available resources (e.g., semantic annotated data for source and target language involved in the task), different modules will be composed in certain ways as disclosed here to construct the back translation component specifically.

The first module 110 is a semantic parser that is built for the target language. Using standard techniques such as statistical Decision Trees we can train such a parser based on annotated corpus in target language. With this parser, the translated target sentence can be parsed and the semantic concepts are extracted. Next, based on the parsing results, backward translation is obtained in a concept by concept manner into source language, which becomes the concept-based back translation itself.

The second module 120 is a semantic parser that is built for the source language, which can be built in the way as mentioned above. With this parser, the source language sentence can be parsed and the semantic concepts are extracted. As detailed below, the parsing results are used to determine the significance and relevance of the concepts generated in the translated target language sentence.

FIG. 2 illustrates an example parsing results of a Chinese sentence.

The third module 130 is a bi-directional machine translation module, which can take the translated target language, as the input as in a conventional real backward translation, and convert the translated sentence back to the source language.

The fourth module 140 is a relevance judge. This relevancy judge measures the relevance and significance of the produced back translation, by comparing with the original source language sentence based on semantics.

One way to measure the relevancy is to use a semantically weighted BLEU score based on modified n-gram precision. In this scheme, the original source language sentence is treated as the reference, and the produced back translation is treated as the translation hypothesis. The relevance between the hypothesis and reference are compared based on a modified n-gram precision as in the BLEU scheme, which is proposed to automatically evaluate translation performance.

In this scenario, however, the n-gram match is semantically re-weighted. That is, higher weights are assigned to the n-grams that contain significant semantic annotations, and lower weights are assigned to the n-grams that contain no significant semantic role. These weights are constrained to the condition of summing up to one for the same n in the n-gram (where n=1, 2, 3, 4).

The semantic significance of the n-grams is judged based on the semantic parsing results, and on a pre-defined list of key concepts for the application domain. For example, in the above example that is in air travel domain, the "LOC_FR", "LOC_TO" and "fares" are key concepts.

The fifth module 150 is the back translation display module, which displays the back translation dynamically based on the relevance and significance of the back translation. Appropriate confidence scores are assigned to the concepts in the back translation. The confidence scores are obtained as the combination of parsing confidence of source/target language and the significance score of the corresponding concept in the application domain, as well as the relevance judge score obtained from the fourth module 140.

Based on the concept confidence score, the entire sentence confidence score is also calculated as the average of these scores. If the sentence-level score is lower than a pre-defined threshold, the back translation is considered unreliable and is rejected. Otherwise, the back translation is considered as valid and will be displayed, which employs different levels of grayscale for concepts of different levels of confidence score. In principle, the concepts with higher confidence scores are displayed with more brightness to attract a user's attention. The concepts of lower confidence scores are displayed in a darker brightness to warn the users that this might not be that reliable or important.

FIG. 3 illustrates a flow diagram of a back translation method 300 in accordance with an exemplary embodiment of the present invention.

While the invention has been described in terms of several exemplary embodiments, those skilled in the art will recognize that the invention can be to practiced with modification within the spirit and scope of the appended claims.

Further, it is noted that, Applicants' intent is to encompass equivalents of all claim elements, even if amended later during prosecution.

What is claimed is:

1. A concept-based back translation system, comprising:
    a target language semantic parser module, which uses statistical techniques including decision trees to train a parser based on annotated corpus in the target language, parses a translated target sentence with the parser, once it has been trained, to extract semantic concepts, and based on results of parsing the translated target sentence, obtains a backward translation of the translated sentence into a source language;
    a source language semantic parser module, which parses a source language sentence to extract semantic concepts and uses results of parsing the source language sentence to determine a significance and relevance of the extract concepts generated in the target language sentence;
    a bi-directional machine translation module, which receives a translated target language sentence and converts the translated target language sentence back into the source language;
    a relevancy judging module, which measures a significance and a relevance of the back translation by semantically comparing the back translation with an original source language sentence; and
    a back translation display module, which displays the back translation dynamically based on the relevance and the significance of the back translation
    wherein the relevancy judging module measures the relevancy using a semantically weighted score based on modified n-gram precision where the original source language sentence is treated as a reference, and the back translation is treated as a translation hypothesis,
    wherein the relevancy between the hypothesis and the reference are compared based on a modified n-gram precision, which automatically evaluates translation performance, and
    wherein a higher weight is assigned to n-grams that contain significant semantic annotations, and a lower weight is assigned to n-grams that contain no significant semantic role, the significance of the n-grams is judged based on semantic parsing results, and on a pre-defined list of key concepts for an application domain.

2. The concept-based translation system according to claim 1, wherein the back translation display module, assigns appropriate confidence scores to the concepts in the back translation,
    wherein the confidence scores are obtained as a combination of parsing confidence of source language, target language, a significance score of a corresponding concept in the application domain, and relevance judge score obtained from the relevancy judging module.

* * * * *